United States Patent
Ishii et al.

(10) Patent No.: US 7,839,821 B2
(45) Date of Patent: Nov. 23, 2010

(54) PACKET TRANSMISSION CONTROL DEVICE AND PACKET TRANSMISSION CONTROL METHOD

(75) Inventors: Hiroyuki Ishii, Yokosuka (JP); Akihito Hanaki, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 553 days.

(21) Appl. No.: 11/365,684

(22) Filed: Mar. 2, 2006

(65) Prior Publication Data
US 2006/0198338 A1 Sep. 7, 2006

(30) Foreign Application Priority Data
Mar. 3, 2005 (JP) ............................. 2005-058788

(51) Int. Cl.
*H04W 4/00* (2009.01)
*H04W 72/00* (2009.01)
(52) U.S. Cl. ..................... 370/329; 455/452.2
(58) Field of Classification Search ......... 455/450–453; 370/329, 330, 328
See application file for complete search history.

(56) References Cited

U.S. PATENT DOCUMENTS

| | | | | |
|---|---|---|---|---|
| 2002/0068588 | A1* | 6/2002 | Yoshida et al. | 455/461 |
| 2002/0077064 | A1* | 6/2002 | Ue et al. | 455/69 |
| 2002/0101919 | A1* | 8/2002 | Takada et al. | 375/225 |
| 2003/0108027 | A1 | 6/2003 | Kim et al. | |
| 2003/0135632 | A1* | 7/2003 | Vrzic et al. | 709/231 |
| 2004/0017825 | A1* | 1/2004 | Stanwood et al. | 370/468 |

FOREIGN PATENT DOCUMENTS

| | | | |
|---|---|---|---|
| EP | 1 351 424 A2 | 10/2003 | |
| EP | 1 511 247 A2 | 3/2005 | |
| GB | 2 405 289 A | 2/2005 | |
| JP | 2002-261772 A | 9/2002 | |
| JP | 2003-152630 A | 5/2003 | |
| JP | 2005-045561 A | 2/2005 | |

(Continued)

OTHER PUBLICATIONS

Average Rate Updating Mechanism in Proportional Fair Scheduler for HDR by Yang et al., published in Nov. 2004.*

(Continued)

*Primary Examiner*—Rafael Pérez-Gutiérrez
*Assistant Examiner*—Daniel Lai
(74) *Attorney, Agent, or Firm*—Crowell & Moring LLP

(57) ABSTRACT

A packet transmission control device and a packet transmission control method for reducing degradation of system throughput due to a wireless mobile station in an abnormal state, in controlling transmission of packets to each of a plurality of wireless terminals. A channel is assigned based on an evaluated value from an evaluation function containing an average transmission rate value for the wireless terminal in its denominator, and if the evaluated value falls in an abnormal value, the average transmission rate value is initialized to reduce the frequency of assigning packets to the wireless terminal if one of multiple wireless terminals transitions to an abnormal state. By initializing the average transmission rate value, a phenomenon that an unnecessarily large number of shared channels are assigned to a wireless mobile station in an abnormal state may be avoided to prevent degradation of overall system throughput.

11 Claims, 10 Drawing Sheets

FOREIGN PATENT DOCUMENTS

WO    WO 2004/075569 A2    9/2004

OTHER PUBLICATIONS

A. Jalali, R. Padovani, R. Pankaj, Data Throughput of CDMA-HDR a High Efficiency-High Data Rate Personal Communication Wireless System, Aug. 6, 2002.*

Jack M. Holtzman, "CDMA Forward Link Waterfilling Power Control", IEEE VTC 2000, Spring, pp. 1663-1667.

3$^{rd}$ Generation Partnership Project, "Technical Specification Group Radio Access Network; Physical layer aspects of UTRA High Speed Downlink Packet Access (Release 4)", 3GPP TR25.848 v4. 0. 0 (Mar. 2001), pp. 1-89, Technical Report.

3$^{rd}$ Generation Partnership Project 2 "3GPP2", "cdma2000 High Rate Packet Data Air Interface Specification", 3GPP2 C. S0024—A Version 1.0 (Mar. 2004) pp. 1-309.

Ameigeiras P et al.: Performance of Packet Scheduling Methods with Different Degree of Fairness in HSDPA, Sep. 26, 2004, Vehicular Technology Conference, 2004. VTC2004-Fall. 2004, Piscataway, NJ, USA IEEE, pp. 860-864, XP010788512.

European Search Report dated Jun. 6, 2006 (Nine (9) Pages).

* cited by examiner

FIG. 6

| TYPE NO. | UPDATE OPPORTUNITY FOR $avrg\ R_n$ | HOW TO CALCULATE $r_n$ |
|---|---|---|
| 1 | PER ALL TTIs WHEN THE MOBILE STATION IS CONNECTED TO THE WIRELESS BASE STATION | THE SIZE OF TRANSMITTED AND ACKNOWLEDGED Data |
| 2 | PER ALL TTIs WHEN THE MOBILE STATION IS CONNECTED TO THE WIRELESS BASE STATION | THE SIZE OF TRANSMITTED Data |
| 3 | PER ALL TTIs WHEN THE MOBILE STATION IS CONNECTED TO THE WIRELESS BASE STATION | SAME AS $R_n$ |
| 4 | PER TTIs WHEN THE CALCULATION FOR SCHEDULING IS PERFORMED | THE SIZE OF TRANSMITTED AND ACKNOWLEDGED Data |
| 5 | PER TTIs WHEN THE CALCULATION FOR SCHEDULING IS PERFORMED | THE SIZE OF TRANSMITTED Data |

PACKET TRANSMISSION CONTROL DEVICE AND PACKET TRANSMISSION CONTROL METHOD

BACKGROUND OF THE INVENTION

1. Field of the Invention

The present invention generally relates to a packet transmission control device and a packet transmission control method, and more particularly to a packet transmission control device and a packet transmission control method for controlling transmission (or scheduling) of downlink packets in a mobile communication system.

2. Description of the Related Art

In the downlink of the mobile communication system, a wireless base station may share one single physical channel with mobile terminals, or mobile stations, that belong to the base station. The physical channel used in such a case will hereinafter be referred to as a downlink shared channel.

In the downlink shared channel, the wireless base station may increase the throughput, or so-called system capacity, by controlling the order of packets to be transmitted to multiple mobile stations that are communicating parties, based on the radio channel quality of each mobile station in an instant. It is known that such control of the order of packets to be transmitted by the wireless base station, which is referred to as "scheduling," may be applied to packet data transmission to increase communication capacity or improve the communication quality (for example, see J. M. Holtzman, IEEE VTC2000 spring). In conventional scheduling, it has been generally assumed that packets to be scheduled should not have severe requirements on transmission delay.

In standardizing the third generation mobile communication system, or so-called IMT-2000, 3GPP and 3GPP2 (Third-Generation Partnership Project/Third-Generation Partnership Project 2) are working on establishing standard specifications, and those associated with W-CDMA are directed by the 3GPP and those associated with cdma2000 by the 3GPP2.

With the rapid growth of the Internet in recent years, standardization of "HSDPA" (High-Speed Downlink Packet Access), which is a high-speed packet transmission mode in the downlink direction, is under way in the 3GPP based on the assumption that, especially in the downlink, a high-speed large volume of traffic will grow due to, for example, downloads from databases and Web sites (for example, see 3GPP TR25.848 v4.0.0) The 3GPP2 is also conducting the standardization of "1x EV-DO" which is a transmission mode dedicated to high-speed data in the downlink direction from the same point of view as above (for example, see 3GPP2 C.S0024 Rev.1.0.0). The term "DO" in cdma2000 1x EV-DO refers to "Data Only."

The HSDPA, for example, is adapted to increase throughput on each individual user and overall system throughput by using a scheme, which is for example referred to as "AMCS" (Adaptive Modulation and Coding Scheme) in the HSDPA, for controlling modulation or encoding rate for a wireless channel depending on radio channel conditions between a mobile station and a wireless base station, in conjunction with scheduling operative in some milliseconds cycles.

A round-robin scheduler is well known for a scheduling algorithm for controlling the order in which queued packets in the wireless base station are to be transmitted. The round-robin scheduler controls the order of packets to be transmitted by assigning the downlink shared channel sequentially (for example, mobile station #1 to # 2 to #3 . . . ) to mobile stations belonging to the wireless base station.

The Proportional Fairness scheduler and MAX C/I (Maximum C/I) scheduler are also known, and they control the order in which queued packets are to be transmitted based on the radio channel condition for each mobile station or an average transmission rate for each mobile station. An example of the typical Proportional Fairness scheduler will now be described on how it effectuates control.

The Proportional Fairness scheduler is a scheduling algorism that performs transmission assignment depending on instantaneous variation in downlink radio channel conditions for each individual mobile station and also supports fairness between mobile stations. Now, the Proportional Fairness scheduler will briefly be described. FIG. 10 is a flowchart illustrating operation of the Proportional Fairness scheduler. The scheduling algorism measures radio channel conditions and an average transmission rate for each mobile station as elements for an evaluation function, determines the evaluation function for each mobile station belonging to the wireless base station, and then assigns a shared channel to a mobile station that has the maximum evaluation function value.

In the figure, an initial value is set as shown below at step S41:

(Initial Value)

$n=1$*(n: an index for a mobile station), $C_{max}=0$ ($C_{max}$: the maximum value from the evaluation function), $n_{max}=0$ ($n_{max}$: an index for a mobile station that has the maximum evaluation function value).

At step S42, necessary elements for calculation of the evaluation function, specifically (1) an instantaneous radio channel condition $R_n$ for each mobile station, and (2) an average transmission rate $avrgR_n$ are measured. At step S43, the evaluation function $C_n$, which is based on the following equation, is calculated using values of the above (1) and (2) measured at step S42:

$$C_n = R_n / avrgR_n$$

At step S44, it is determined whether the evaluation function value $C_n$ calculated at step S43 exceeds $C_{max}$. In this case, $C_{max}=0$, and then it is determined to be YES at step S44, and at step S45, the value of $C_n$ calculated at step S43 is set to $C_{max}$, or $n_{max}=1$. Then at step S46, n is incremented by +1, the evaluation function values are sequentially determined by the number of mobile stations that are in communication with the wireless base station through the loop procedure at step S47, and at step S48, a mobile station that has the maximum evaluation function value is selected and the shared channel is assigned to the mobile station.

The Proportional Fairness scheduler is expected to provide higher throughput than the round-robin scheduler because the transmission assignment is performed under a relatively good condition in downlink channel quality for each mobile station. In addition, using division by the average transmission rate for each mobile station may reduce the evaluation function value of a mobile station that has a higher average transmission rate to provide highly fair assignment in terms of time.

Here, because the evaluation function according to the Proportional Fairness scheduler calculates in such a way that the numerator, which is the instantaneous radio channel condition $R_n$, is divided by the denominator, which is the average transmission rate $avrgR_n$, the evaluation function value $C_n$ will become very large as the average transmission rate $avrgR_n$ approaches zero. In this case, this implies that the average transmission rate $avrgR_n$ is equal to zero, that is, the frequency of assigning a shared channel to the mobile station n is low, and it is generally proper operation that the evaluation function value $C_n$ becomes large because a shared channel should be assigned to the mobile station n. In mobile communication, however, a mobile station may abruptly enter a tunnel or basement where radio waves cannot reach the station, and therefore the average transmission rate $avrgR_n$ may essentially approach zero. The term "essentially" here means that the average transmission rate would approach zero even when ample shared channel is assigned to the mobile station. In such a case, the shared channel must be assigned to other mobile stations in addition to the mobile station n in terms of the entire system. In other words, a phenomenon of the evaluation function value getting larger for such mobile station in an abnormal state as described above poses a problem of performance of the entire system being degraded.

On the other hand, high-speed packet transmission modes such as the HSDPA and 1x EV-DO generally employ a best effort type communication, and they provide a data transmission with a higher communication speed when there are small number of mobile stations to which the channel is assigned, and provide a data transmission with a lower communication speed when there are large number of mobile stations to which the channel is assigned. For such high-speed packet transmission modes, however, it is under consideration to provide services such as Streaming and VoIP, which are required to satisfy predetermined requirements on transmission delay. Therefore, it is required to provide a Guaranteed Bit Rate that guarantees a certain minimum rate for predetermined service types in the high-speed packet transmission modes. The Guaranteed Bit Rate implies a control in which, for example, a minimum of 64 kbps is guaranteed for any mobile stations that are using Streaming.

The following approach, for example, is conceivable as a method for providing the Guaranteed Bit Rate feature in the Proportional Fairness scheduler: for the evaluation function $C_n$, $C_n = R_n/(avrgR_n - R_{target})$ may be used in place of $C_n = R_n/avrgR_n$, where $R_{target}$ is the transmission rate to be guaranteed.

However, even with the Proportional Fairness scheduler having the Guaranteed Bit Rate feature, there is a problem that the average transmission rate $avrgR_n$ approaches the transmission rate to be guaranteed $R_{target}$, or the evaluation function value $C_n$ becomes extremely large as the average transmission rate $avrgR_n$ falls below the transmission rate to be guaranteed $R_{target}$.

JP2002-261772A describes a technique in which, if wireless stations that use different wireless transmission rates to transmit packets coexist in the same wireless channel, the wireless stations are grouped by wireless transmission rates depending on the traffic condition and packets are assigned to wireless channels that are different for each group to maintain good transmission efficiency.

Further, JP2003-152630A describes a technique in which, in the transmission assignment of the shared channel, temporal distribution of instantaneous downlink quality information is added to decision factors in addition to instantaneous downlink quality and average downlink quality for each mobile station to perform the transmission assignment of the shared channel for temporally fair transmission assignment.

As described above, the Proportional Fairness scheduling is one of scheduling algorisms for determining the order in which queued packets in the wireless base station are to be transmitted.

However, the conventional Proportional Fairness scheduling algorism suffers from a problem of degraded performance of the entire system because, if a mobile station transitions to an abnormal state, the average transmission rate $avrgR_n$ which is a denominator of the evaluation function approaches zero, and as a result, the evaluation function value $C_n$ becomes very large and an unnecessarily large number of shared channels are assigned to the mobile station.

The problem described above also resides not only in the conventional Proportional Fairness scheduling algorism but also in the scheduling algorism that provides the Guaranteed Bit Rate feature as described above.

Furthermore, such a problem cannot be solved with techniques in JP2002-261772A or JP2003-152630A described above.

The present invention has been made in view of the above problem, and it is an object of the invention to provide a packet transmission control device and a packet transmission control method for possibly reducing degradation of system throughput due to a mobile station in an abnormal state.

SUMMARY OF THE INVENTION

A packet transmission control device as claimed in claim 1 of the invention is a packet transmission control device for controlling transmission of packets to each of a plurality of wireless terminals, comprising: channel assignment means for assigning a channel to the plurality of wireless terminals; wherein if one wireless terminal of the plurality of wireless terminals transitions to an abnormal state, the frequency of assigning packets to the wireless terminal is reduced. In this way, a phenomenon that an unnecessarily large number of shared channels are assigned to a wireless mobile station in an abnormal state may be avoided to prevent degradation of overall system throughput.

The packet transmission control device as claimed in claim 2 of the invention is the packet transmission control device according to claim 1, wherein the channel assignment means assigns the channel based on an evaluated value from an evaluation function, the evaluation function containing an average transmission rate value for each of the wireless terminals in its denominator, and the packet transmission control device further comprises initializing means for initializing the average transmission rate if the evaluated value falls in an abnormal value. By initializing the average transmission rate value, a phenomenon that an unnecessarily large number of shared channels are assigned to a wireless mobile station in an abnormal state may be avoided to prevent degradation of overall system throughput.

The packet transmission control device as claimed in claim 3 of the invention is the packet transmission control device according to claim 2, wherein the initializing means initializes the average transmission rate value if the average transmission rate value is smaller than a predetermined threshold in consecutive predetermined time intervals, and the channel assignment means assigns the channel based on the evaluated value from the evaluation function using the average transmission rate value initialized by the initializing means. By initializing the average transmission rate value if it is smaller than a predetermined threshold in consecutive predetermined time intervals, a phenomenon that an unnecessarily large number of shared channels are assigned to a wireless mobile station in an abnormal state may be avoided to prevent degradation of overall system throughput.

The packet transmission control device as claimed in claim 4 of the invention is the packet transmission control device according to claim 3, wherein the evaluation function is $C_n = (R_n)^\alpha/(avrgR_n)^\beta$, where $R_n$ is the radio channel condition and $avrgR_n$ is the average transmission rate of a wireless terminal n, and the wireless terminal that has a maximum evaluated value from the evaluation function $C_n$ is selected as the terminal of a receiving side to which packets are transmitted. Selecting a wireless terminal that has the maximum evaluated value contributes to preventing degradation of overall system throughput.

The packet transmission control device as claimed in claim 5 of the invention is the packet transmission control device according to claim 4, wherein the initializing means applies the same value as the radio channel condition $R_n$ to the value of the average transmission rate $avrgR_n$ for the wireless terminal if the average transmission rate for the wireless terminal is smaller than the predetermined threshold. Applying the same value as the radio channel condition $R_n$ to the value of the average transmission rate $avrgR_n$ facilitates initialization.

The packet transmission control device as claimed in claim 6 of the invention is the packet transmission control device according to claim 2, further comprising minimum guaranteed transmission rate setting means for setting a minimum guaranteed transmission rate, and wherein the initializing means initializes the average transmission rate value if a value determined by subtracting the minimum guaranteed transmission rate from the average transmission rate for the wireless terminal is smaller than the predetermined threshold in consecutive predetermined time intervals, and the channel assignment means assigns the channel based on the evaluated value from the evaluation function using the average transmission rate value initialized by the initializing means. By initializing the average transmission rate value if it is smaller than a predetermined threshold in consecutive predetermined time intervals, a phenomenon that an unnecessarily large number of shared channels are assigned to a wireless mobile station in an abnormal state may be avoided to prevent degradation of overall system throughput.

The packet transmission control device as claimed in claim 7 of the invention is the packet transmission control device according to claim 6, wherein the evaluation function is $C_n = (R_n)^\alpha / (avrgR_n - R_n^{(target)})^\beta$, where $R_n$ is the radio channel condition, $avrgR_n$ is the average transmission rate, and $R_n^{(target)}$ is the minimum guaranteed transmission rate of the wireless terminal n, and the wireless terminal that has a maximum evaluated value from the evaluation function $C_n$ is selected as the terminal of a receiving side to which packets are transmitted. Selecting a wireless terminal that has the maximum evaluated value contributes to preventing degradation of overall system throughput.

The packet transmission control device as claimed in claim 8 of the invention is the packet transmission control device according to claim 7, wherein the initializing means applies the same value as the radio channel condition $R_n$ to the value of the average transmission rate $avrgR_n$ for the wireless terminal, if the average transmission rate for the wireless terminal is smaller than the predetermined threshold and a value determined by subtracting the minimum guaranteed transmission rate value from the value of the average transmission rate $avrgR_n$ for the wireless terminal is smaller than the predetermined threshold. Applying the same value as the radio channel condition $R_n$ to the value of the average transmission rate $avrgR_n$ facilitates initialization.

The packet transmission control device as claimed in claim 9 of the invention is the packet transmission control device according to claim 3, wherein the initializing means sets the threshold on any one of the following bases: per service type, per agreement type, per terminal type, per user, per cell, or per Priority Class. In this way, the threshold can be set in a more appropriate manner.

The packet transmission control device as claimed in claim 10 of the invention is the packet transmission control device according to claim 3, wherein the initializing means sets the consecutive predetermined time intervals on any one of the following bases: per service type, per agreement type, per terminal type, per user, per cell, or per Priority Class. In this way, the consecutive predetermined time intervals can be set in a more appropriate manner.

The packet transmission control device as claimed in claim 11 of the invention is the packet transmission control device according to claim 2, wherein either SIR or CQI is used in place of the average transmission rate for the wireless terminal. When an average radio channel quality such as SIR and CQI is used in place of the average transmission rate, a phenomenon that an unnecessarily large number of shared channels are assigned to a wireless mobile station in an abnormal state may also be avoided to prevent degradation of overall system throughput.

A packet transmission control method as claimed in claim 11 of the invention is a packet transmission control method for controlling transmission of packets to each of a plurality of wireless terminals, comprising: channel assignment step of assigning a channel based on an evaluated value from an evaluation function, the evaluation function containing an average radio channel quality value such as an average transmission rate, SIR, and CQI for each of the wireless terminals in its denominator; and initializing step of initializing the average radio channel quality value if the evaluated value falls in an abnormal value, wherein if one wireless terminal of the plurality of wireless terminals transitions to an abnormal state, the frequency of assigning packets to the wireless terminal is reduced. By initializing the average radio channel quality value, a phenomenon that an unnecessarily large number of shared channels are assigned to a mobile station in an abnormal state may be avoided to prevent degradation of overall system throughput.

As an instance "if a wireless terminal transitions to an abnormal state," it is conceivable that it includes when the denominator of the evaluation function approaches zero, when the denominator of the evaluation function approaches a predetermined value, when the error rate in the downlink exceeds a predetermined value, and when the average value of CQI (Channel Quality Indicator) reported from a mobile station falls below a predetermined value.

As described above, the present invention has an advantage that, by initializing the average transmission rate value $avrgR_n$ if the average transmission rate value $avrgR_n$ is smaller than a predetermined threshold $R_{threshold}$ in consecutive predetermined time intervals, a phenomenon that an unnecessarily large number of shared channels are assigned to a wireless mobile station in an abnormal state may be avoided to prevent degradation of overall system throughput. The same advantage may also be expected when an average radio channel quality such as SIR and CQI is used in place of the average transmission rate.

BRIEF DESCRIPTION OF THE DRAWINGS

FIG. 6 shows an example of combination of update opportunities for the average transmission rate of a mobile station;

DETAILED DESCRIPTION OF THE PREFERRED EMBODIMENTS

Figure 1:
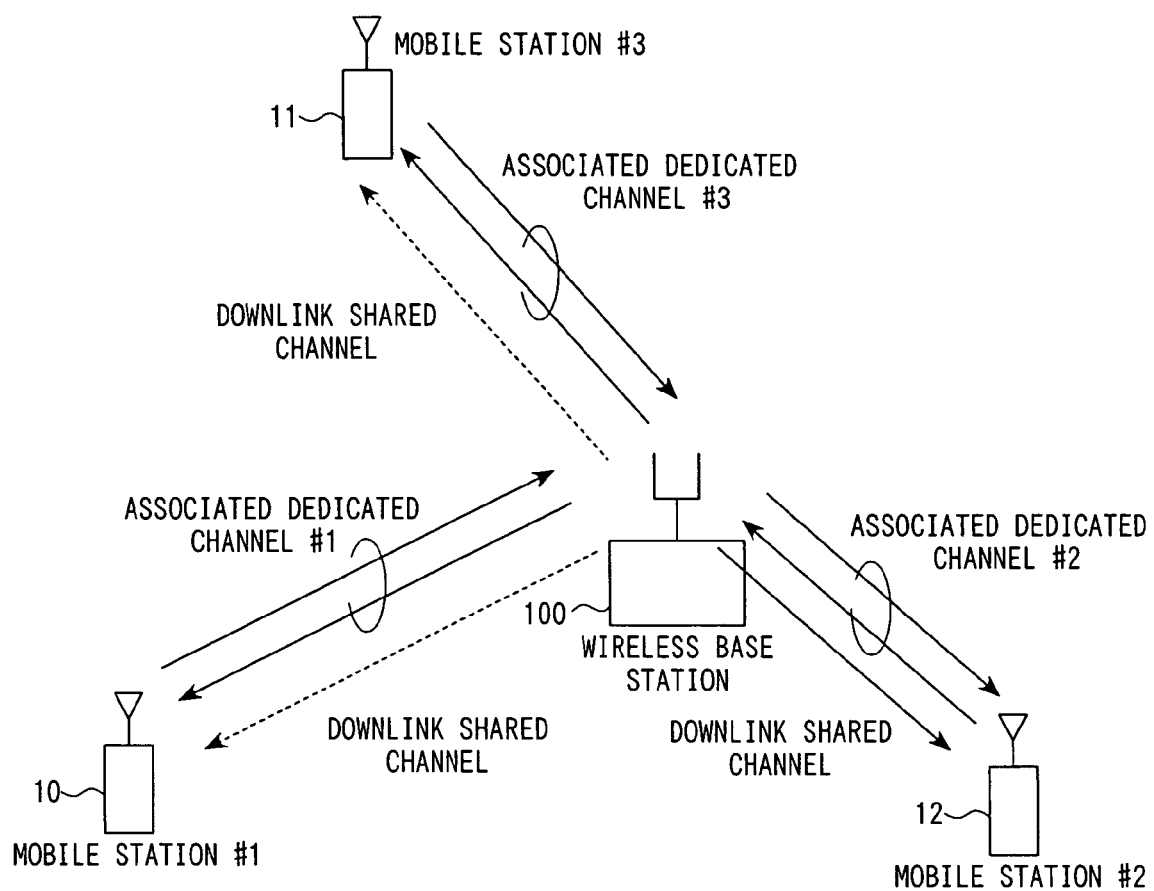
FIG. 1 shows an example of configuration for a mobile communication system using a packet transmission control device according to an embodiment of the invention.

The embodiments of the present invention will now be described with reference to drawings. In each of the drawings referenced in the description below, like elements with those in other drawings are designated with the same reference characters.

(Configuration of a Mobile Communication System)

FIG. 1 shows an example of configuration for a mobile communication system using a packet transmission control device according to an embodiment of the invention.

In this figure, the mobile communication system is composed of a wireless base station 100 functioning as a packet transmission control device, and multiple wireless terminals or mobile stations (#1 to #3) 10 to 12.

A mobile communication system with the above HSDPA applied is shown in this figure. The downlink packet transmission in HSDPA uses a downlink shared physical channel HS-PDSCH (High Speed—Physical Downlink Shared Channel, and in transport channel, HS-DSCH: High Speed Downlink Shared Channel) that is commonly used by each of the mobile stations (#1 to #3) 10 to 12, a downlink shared control channel HS-SCCH (High Speed-Shared Control Channel) that is commonly used by each of the mobile stations (#1 to #3) 10 to 12, and associated dedicated channels A-DPCH (Associated-Dedicated Physical Channel) #1 to #3 (up/downlink bi-directional channels) that are associated with the shared physical channel and separately assigned to each of the mobile stations (#1 to #3) 10 to 12.

Additionally, in the uplink, HS-DPCCH (High Speed—Dedicated Physical Control Channels) that is a HSDPA conrol channel and separately assigned to each of the mobile stations (#1 to #3) 10 to 12 is used. In the uplink, the associated dedicated channels #1 to #3 carry pilot symbols and power control commands (TPC commands) used in transmission on the downlink associated dedicated channels in addition to user data, and the above HSDPA control channel carries downlink quality information used for scheduling or AMCS (Adaptive Modulation and Coding) as well as acknowledgment information of the downlink shared channel HS-DSCH.

On the other hand, in the downlink, the associated dedicated channels #1 to #3 carry transmission power control commands and the like for the uplink associated dedicated channels, and the shared physical channel carries user data.

Each of the mobile stations (#1 to #3) 10 to 12 have identical configurations and functions, they are referred to as a mobile station n (n≧1) in the description below unless otherwise specified.

Figure 2:
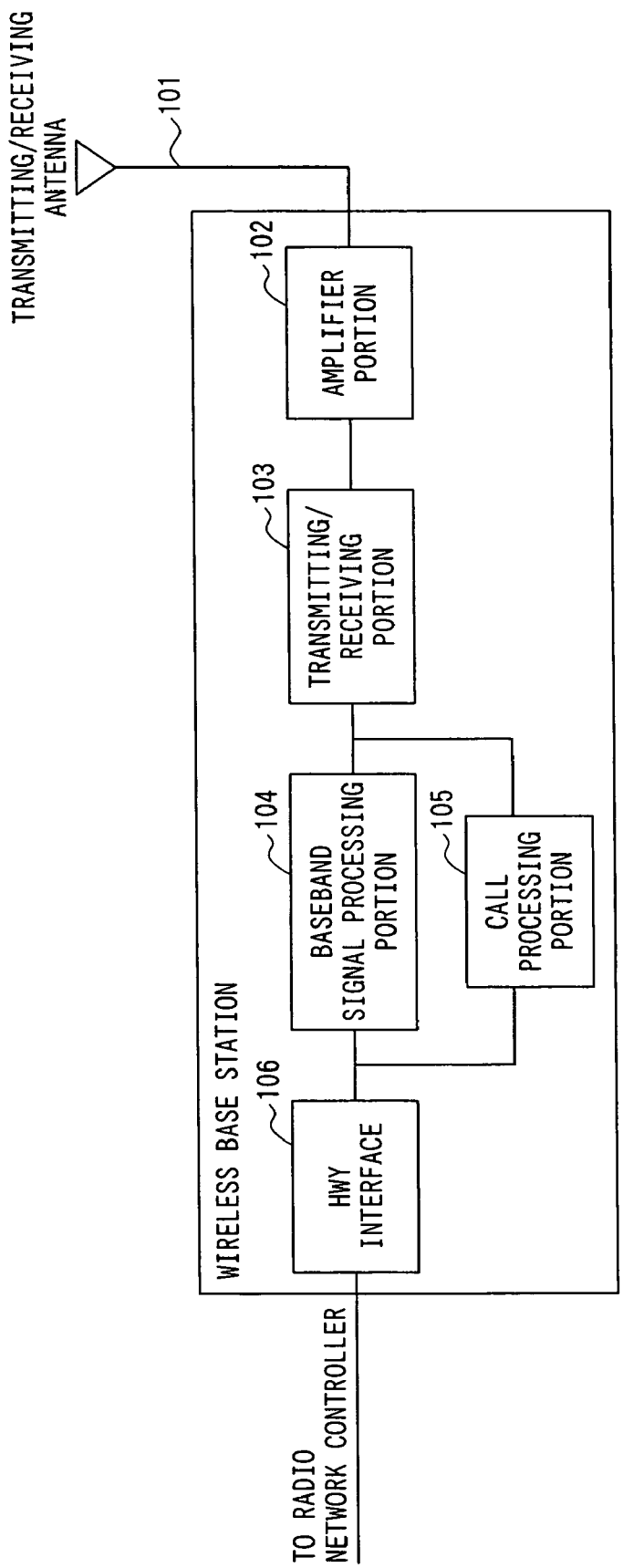
FIG. 2 is a functional block diagram illustrating an example of configuration for the wireless base station shown in FIG. 1.

FIG. 2 is a functional block diagram illustrating an example of configuration for the wireless base station 100 shown in FIG. 1.

In this figure, the wireless base station 100 is composed of a transmitting/receiving antenna 101, an amplifier portion 102, a transmitting/receiving portion 103, a baseband signal processing portion 104, a call processing portion 105, and an HWY interface 106. Downlink packet data are inputted to the baseband signal processing portion 104 from a radio network controller, which is a higher layer node, through the HWY interface 106. The baseband signal processing portion 104 performs repeat control (H-ARQ (Hybrid ARQ)) processing, scheduling, transport format selection, channel coding, and spreading to transfer the data to the transmitting/receiving portion 103. The transmitting/receiving portion 103 performs frequency conversion to convert the baseband signal outputted from the baseband signal processing portion 104 to the wireless frequency band, and the signal is amplified in the amplifier portion 102 and transmitted from the transmitting/receiving antenna 101.

On the other hand, for uplink data, the wireless frequency signal received at the transmitting/receiving antenna 101 is amplified in the amplifier portion 102, and frequency-converted to the baseband signal in the transmitting/receiving portion 103. The baseband signal will be transferred to the radio network controller through the HWY interface 106 after subjected to despreading, RAKE combining, and error correction decoding.

The call processing portion 105 transmits and receives call processing control signals to and from the radio network controller, and manages the state of the wireless base station 100 or assigns resources.

(Example of Configuration of the Baseband Signal Processing Portion)

Figure 3:
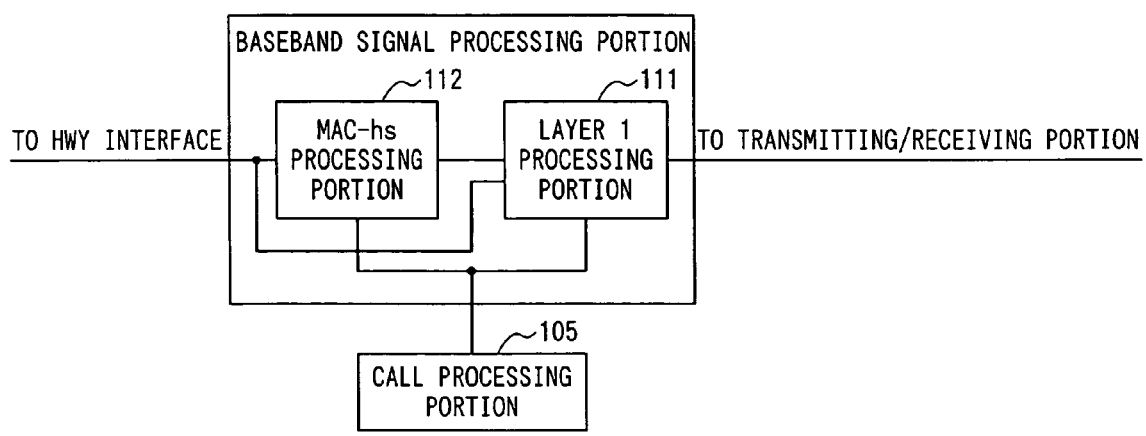
FIG. 3 is a functional block diagram illustrating a functional configuration of a baseband signal processing portion in the wireless base station.

FIG. 3 is a functional block diagram illustrating an example of a functional configuration of a baseband signal processing portion 104.

In this figure, the baseband signal processing portion 104 is composed of a layer 1 processing portion 111 and a MAC-hs (the abbreviation of Medium Access Control-HSDPA) processing portion 112, and the layer 1 processing portion 111 and the MAC-hs processing portion 112 are connected to the call processing portion 105. The layer 1 processing portion 111 performs channel coding for the downlink data and channel decoding for the uplink data, transmission power control for up/downlink dedicated channels, RAKE combining, and spreading/despreading. The MAC-hs processing portion 112 performs HARQ (Hybrid ARQ) for the downlink shared channel in HSDPA, and scheduling of queued packets.

(Example of Configuration of the MAC-hs Processing Portion)

Figure 4:
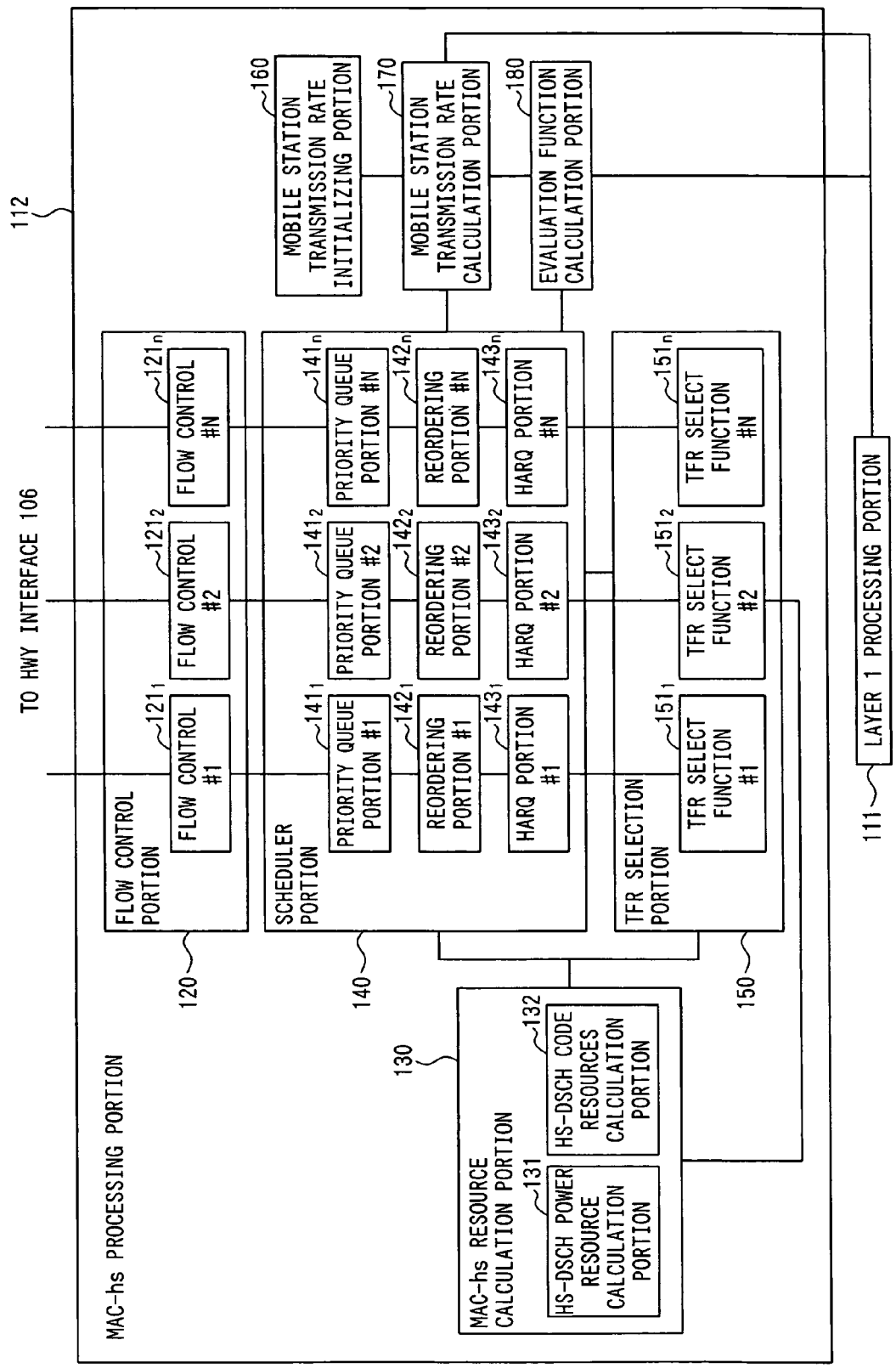
FIG. 4 is a functional block diagram illustrating a functional configuration of a MAC-hs processing portion in the wireless base station.

FIG. 4 is a functional block diagram illustrating an example of a functional configuration of a MAC-hs processing portion 112 shown in FIG. 3. In this figure, the MAC-hs processing portion 112 includes, for example, the following functional blocks:

(1) flow control portion 120, (2) MAC-hs resource calculation portion 130, (3) scheduler portion 140, (4) TFR (Transport Format and Resource) selection portion 150, (5) mobile station transmission rate initializing portion 160

(6) mobile station transmission rate calculation portion 170, and (7) evaluation function calculation portion 180.

The (1) flow control portion 120 has a function for adjusting the transmission rate of the signal received from the radio network controller through the HWY interface 106 based on capacity of the buffer implemented thereon and the like. Each of the flow controls (#1 to #N) $121_1$ to $121_N$ monitor the amount of packet flow, and regulate the amount of delivery of transmitted packets as the packet flow increases and available memory of the queue buffer diminishes.

The (2) MAC-hs resource calculation portion 130 has a HS-DSCH power resource calculation portion 131 and HS-DSCH code resources calculation portion 132 that calculate radio resources (such as power resources, code resources and hardware resources) assigned to HS-DSCH.

The (3) scheduler portion 140 has N priority queues (#1 to #N) $141_1$ to $141_N$, N reordering portions (#1 to #N) $142_1$ to $142_N$, and N HARQ portions (#1 to #N) $143_1$ to $143_N$. The priority queues (#1 to #N) $141_1$ to $141_N$ are queues for each connection, and the scheduler portion 140 usually has one priority queue for one user, and if, however, one user has multiple connections, it has multiple priority queues for one user. The priority queues (#1 to #N) $141_1$ to $141_N$ contain downlink data and keep them accumulated until selected in scheduling. The reordering portions (#1 to #N) $142_1$ to $142_N$ provide sequence numbers with the data in order to allow the mobile station n to control the downlink receiving order in repeat control in HARQ, and performs window control to prevent the receiving buffer of the mobile station n from overflowing. The HARQ portions (#1 to #N) $143_1$ to $143_N$ performs repeat control through the stop-and-wait protocol of M processes based on uplink Ack/Nack feedbacks.

Figure 5:
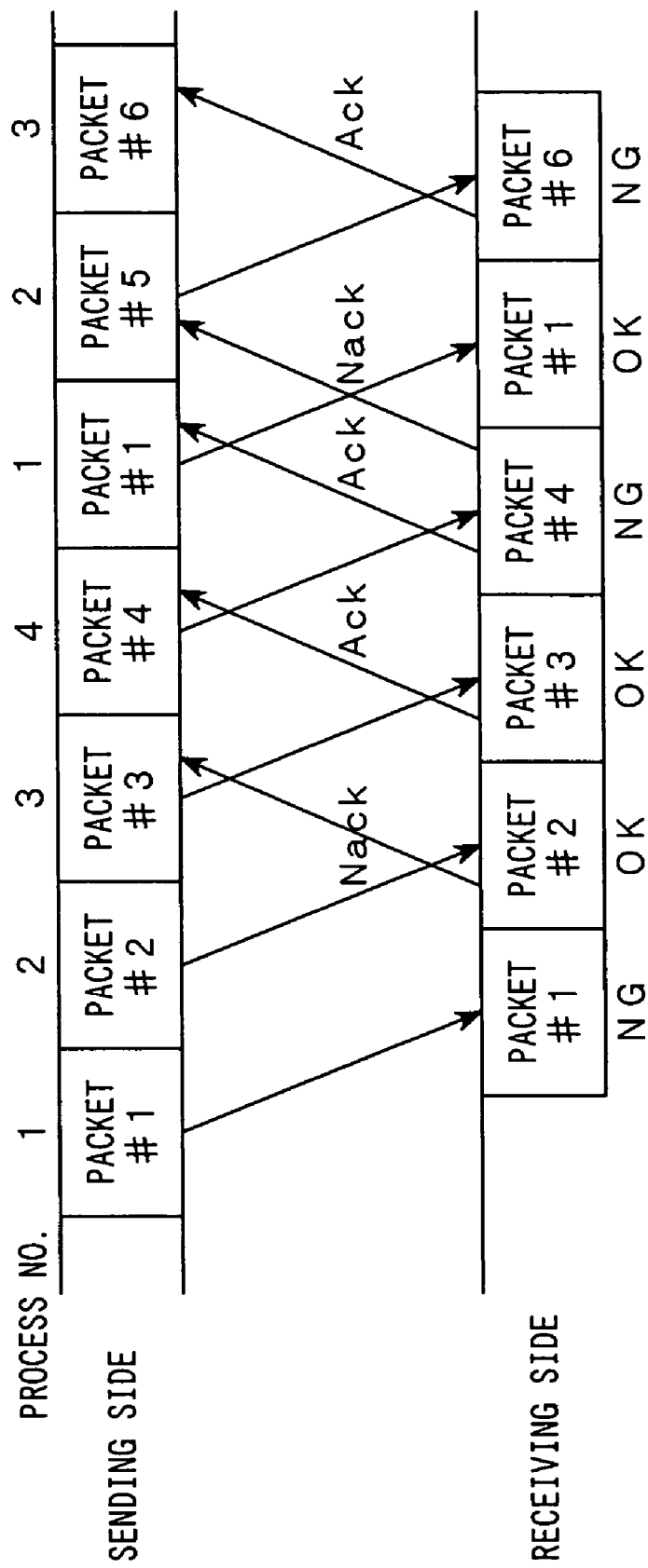
FIG. 5 shows an example of operation of stop-and-wait protocol performed in HARQ portions.

FIG. 5 shows an example of operation of stop-and-wait protocol performed in HARQ portions (#1 to #N) $143_1$ to $143_N$ In the stop-and-wait protocol ARQ, when the receiving side receives a packet from the sending side, it returns transmission acknowledgment (Ack/Nack) to the sending side. In this figure, the receiving side has not properly received the packet #1 when it has been received, and thus returns negative acknowledgment response (Nack) to the sending side. The packet #2 has been properly received, and thus acknowledgment response (Ack) is returned to the sending side. The receiving side repeats returning Ack or Nack to the sending side in the order of received packets.

The (4) TFR (Transport Format and Resource) selection portion 150 has N TFR Select functions (#1 to #N) $151_1$ to $151_N$. These TFR Select functions $151_1$ to $151_N$ determine a transport format (number of codes, symbol constellation, and coding rate) of downlink transmission channel (HS-PDSCH, and in transport channel, HS-DSCH) and transmission power of HS-PDSCH (HS-DSCH) assigned to a selected user based on CQI (Channel Quality Indicator) which is a downlink quality indicator received in the uplink channel, radio resources (power resources, code resources and hardware resources) assigned to HS-PDSCH (HS-DSCH) calculated in the MAC-hs resource calculation portion, and the like. The layer 1 processing portion is informed of the transport format and transmission power for the HS-PDSCH (HS-DSCH) determined by these TFR Select functions.

The (5) mobile station transmission rate initializing portion 160 receives average transmission rate $avrgR_n$ (average transmission rate calculated for each of the priority queues $141_1$ to $141_N$) for the mobile station n from the mobile station transmission rate calculation portion 170 as described below, determines whether or not the average transmission rate $avrgR_n$ should be initialized, and if it is determined that the average transmission rate $avrgR_n$ should be initialized, informs the mobile station transmission rate calculation portion 170 of the determination.

An exemplary method of determining whether or not the average transmission rate $avrgR_n$ should be initialized will now be described.

For example, if the average transmission rate $avrgR_n$ is smaller than a predetermined threshold $R_{threshold}$, it is determined that the average transmission rate $avrgR_n$ should be initialized.

For example, if the average transmission rate $avrgR_n$ is smaller than a predetermined threshold $R_{threshold}$ in consecutive predetermined time intervals $Time_{threshold}$, it is also determined that the average transmission rate $avrgR_n$ should be initialized. Therefore, determination may be made to initialize the average transmission rate $avrgR_n$ if the average transmission rate $avrgR_n$ is always smaller than a predetermined threshold $R_{threshold}$ in consecutive 50 TTIs (i.e. 100 ms because 1 TTI=2 ms). Alternatively, determination may also be made to initialize the average transmission rate $avrgR_n$ if there are 20 or more TTIs that the average transmission rate $avrgR_n$ is smaller than a predetermined threshold $R_{threshold}$ in consecutive 50 TTIs (i.e. 100 ms because 1 TTI=2 ms).

Here, when the consecutive predetermined time intervals are calculated, it may be calculated in consideration of update opportunities for $avrgR_n$ as described below. That is, the consecutive predetermined time intervals may be calculated for all TTIs when the mobile station is connected to the wireless base station if the update opportunity indicates "per all TTIs during connected time," and the consecutive predetermined time intervals may be calculated for such TTIs when the calculation for scheduling is performed if the update opportunity indicates "per TTIs used in the calculation for scheduling." In latter case, for example, if the calculation for scheduling has been performed in first 10 TTIs, the calculation for scheduling has not been performed in second 10 TTIs and the calculation for scheduling has been performed in third 10 TTIs, and the average transmission rate $avrgR_n$ is smaller than a predetermined threshold $R_{threshold}$ in the 20 TTIs when the calculation for scheduling has been performed, the calculation is performed assuming that "the average transmission rate $avrgR_n$ is smaller than a predetermined threshold $R_{threshold}$ in consecutive 20 TTIs."

Although the predetermined threshold $R_{threshold}$ is shown as a common value to all mobile stations in the above example, it may be set for each mobile station. The predetermined threshold $R_{threshold}$ may be set on per service type, per agreement type, per terminal type, per user, per cell, or per Priority Class bases.

Further, although each value of the consecutive predetermined time intervals $Time_{threshold}$ is shown as a common value to all mobile stations in the above example, it may be set for each mobile station. The predetermined threshold $Time_{threshold}$ may be set on per service type, per agreement type, per terminal type, per user, per cell, or per Priority Class bases.

The (6) mobile station transmission rate calculation portion 170 calculates transmission rate (average transmission rate) for the mobile station n based on the following equation:

$$avrgR_n(t) = \delta * avrgR_n(t-1) + (1-\delta) * r_n \quad (1)$$

In the above equation, δ is a forgetting factor, which specifies an averaged interval ($0 \leq \delta \leq 1$). The parameter δ may be set based on a service type or agreement type with respect to data in the priority queues $141_1$ to $141_N$, a receiver type (RAKE receiver, an equalizer, a receiver diversity, an interference canceller, other UE capabilities (indicators classified by the receivable modulation mode, the receivable number of codes or number of bits, and the like) or the like), a cell type, and a priority class type.

In the equation (1), $r_n$ represents an instantaneous transmission rate, and in MAC-hs processing portion 121, any one of the followings will be the data rate (instantaneous data rate) for the mobile station n:

<1> the data size (amount of data) of transmitted and acknowledged data,

<2> the data size (amount of data) of transmitted data, or

<3> an instantaneous downlink radio channel condition reported from the mobile station n or the data size (amount of data) of transmittable data estimated from the radio channel condition.

Here, the instantaneous downlink radio channel condition reported from the mobile station n in the above <3> may be, for example, SIR on the downlink or may be CQI informed by a mobile station through the uplink to the wireless base station.

Five combinations of the update opportunities for the average transmission rate of the mobile station n as determined based on the above equation (1) are conceivable as shown in FIG. 6. These include:

| Type No. | Update opportunity for avrgR$_n$ | How to calculate r$_n$ |
|---|---|---|
| 1 | Per all TTIs when the mobile station is connected to the wireless base station | Above <1> |
| 2 | Per all TTIs when the mobile station is connected to the wireless base station | Above <2> |
| 3 | Per all TTIs when the mobile station is connected to the wireless base station | Above <3> |
| 4 | Per TTIs when the calculation for scheduling is performed | Above <1> |
| 5 | Per TTIs when the calculation for scheduling is performed | Above <2>. |

When the mobile station transmission rate calculation portion 170 informed from the mobile station transmission rate initializing portion 160 that the average transmission rate avrgR$_n$ should be initialized, it initializes the average transmission rate avrgR$_n$.

As a specific initialization, for example, it is conceivable to apply the same value as the instantaneous radio channel condition R$_n$ to the average transmission rate avrgR$_n$.

Alternatively, for initialization for example, the average transmission rate avrgR$_n$ may be calculated as described below. That is, the average transmission rate avrgR$_n$ may be calculated using the following equations instead of the equation (1):

$$\text{avrg}R_n = R_n(t=1),$$

$$\text{avrg}R_n(t) = \delta'^* \text{avrg}R_n(t-1) + (1-\delta')^* r_n(t>1),$$

where, $\delta' = \min(1-1/t, \delta)$.

The function min(A,B) here outputs the value of A or B, whichever is smaller. The R$_n$ is an instantaneous downlink radio channel condition reported from the mobile station n or the data size of transmittable data estimated from the radio channel condition. t is an index of TTIs. To initialize the average transmission rate avrgR$_n$, it is also conceivable that the mobile station transmission rate calculation portion 170 sets one to the value of t.

In addition to the approaches as described above, for example, the MAC-hs processing portion 112 is provided with a function for measuring the transmission rate for data in the data link layer, and after the mobile station n establishes data communication, measures the amount of data flown into the MAC-hs processing portion 112 periodically in order to determine the average transmission rate for the mobile station n. The periodically measured amount of data may be used as the data rate (instantaneous data rate) for the mobile station n.

The (7) evaluation function calculation portion 180 calculates the evaluation function for each mobile station, which is used in scheduling within the scheduler portion 140. The scheduler portion 140 selects a mobile station n that has the maximum evaluation function value of evaluation function values for each mobile station calculated in the evaluation function calculation portion 180, and assigns a HS-PDSCH (HS-DSCH) to the mobile station n (i.e. performs transmission assignment for the downlink).

The layer 1 processing portion 111 in FIG. 3 receives information indicative of the downlink radio channel condition reported on HS-DPCCH from each mobile station, and outputs it to the evaluation function calculation portion 180 in the MAC-hs processing portion 112. The information indicative of the downlink radio channel condition may be, for example, an instantaneous receiving SIR (Signal-to-Interference), BER (Bit Error Rate), CQI (Channel Quality Indicator), and the like.

Figure 7:
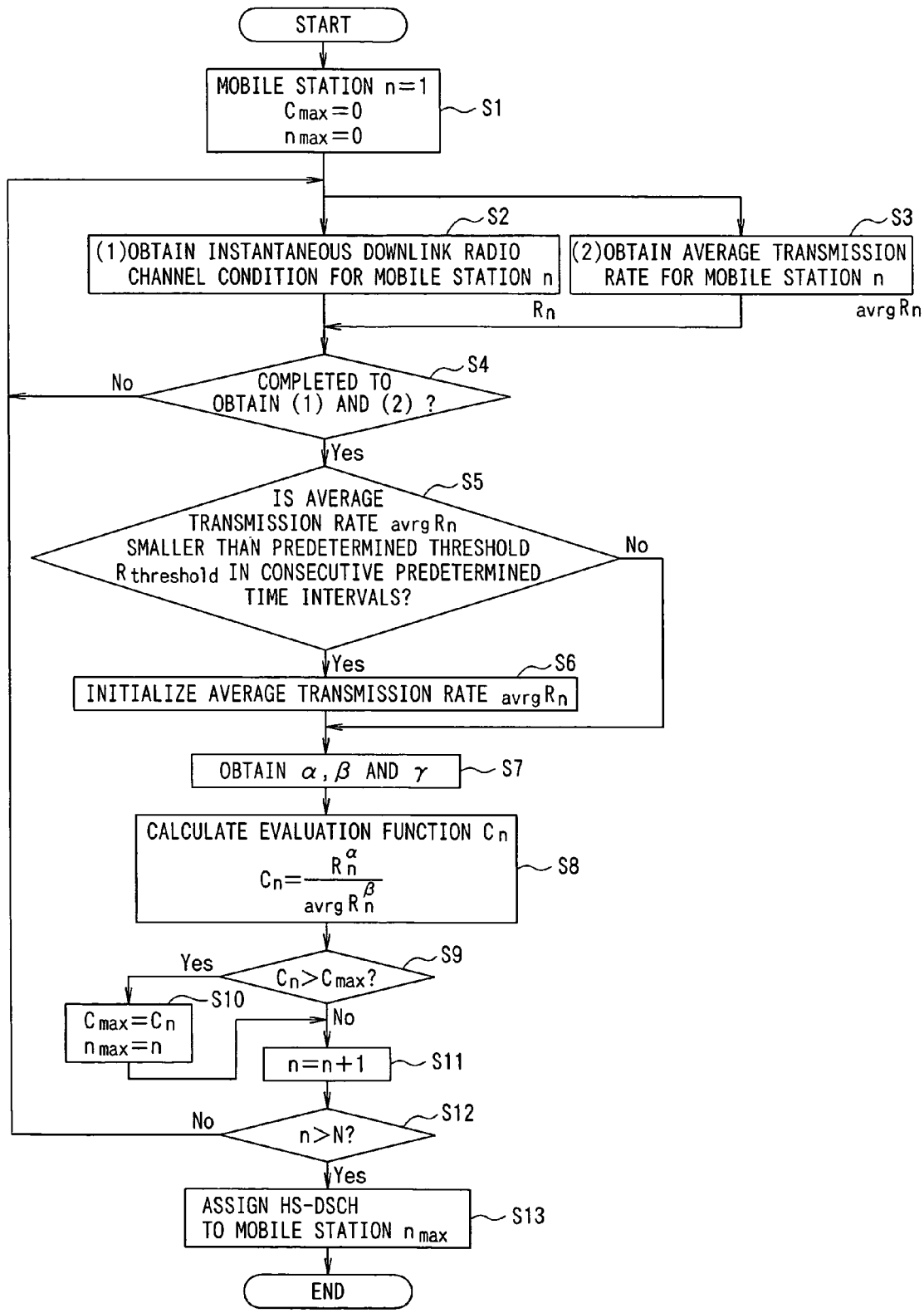
FIG. 7 is a flowchart illustrating the scheduling operation in the MAC-hs processing portion in FIG. 4.

The scheduling operation in the MAC-hs processing portion 112 according to the invention will now be described with reference to the flowchart in FIG. 7.

Embodiment 1

In this figure, the evaluation function calculation portion 180 in the MAC-hs processing portion 112 first sets an initial value used to calculate an evaluation function for a mobile station n at step S1.

(Setting an Initial Value)

n=1

$C_{max}=0$ $n_{max}=0$

In the above equations, n represents an index for the mobile station, $C_{max}$ represents the maximum value from the evaluation function, and $n_{max}$ represents an index for the mobile station that has the maximum evaluation function value.

At steps S2 and S3, information is obtained for use in calculating the evaluation function $C_n$, as described below in (1) and (2).

(1) Step S2: an instantaneous downlink radio channel condition for the mobile station n outputted from the layer 1 processing portion 111, or the size (amount of data) of transmittable data estimated from the radio channel condition is obtained (where "size of transmittable data estimated from the radio channel condition" represents a data size estimated to be transmittable with a predetermined error rate from both CQI indicative of downlink quality or instantaneous SIR for the downlink transmission channel, and radio resources that are to be assigned to HS-DSCH and calculated in the MAC-hs resource calculation portion).

(2) Step S3: an average transmission rate avrgR$_n$ for the mobile station n outputted from the mobile station transmission rate calculation portion 170 is obtained.

At step S4, it is determined whether all information in the above (1) and (2) has been obtained, and if it is determined that all information in the above (1) and (2) has been obtained (YES at step S4), then the process proceeds to the next step, and otherwise (NO at step S4), information from (1) or (2), which has not been obtained, is obtained.

At step S5, it is determined whether or not the average transmission rate avrgR$_n$, should be initialized. For example, in consecutive predetermined time intervals Time$_{threshold}$, if the average transmission rate avrgR$_n$ is smaller than a predetermined threshold R$_{threshold}$ (YES at step S5), then the process proceeds to step S6, and otherwise (NO at step S5), it proceeds to step S7.

At step S6, the average transmission rate avrgR$_n$ is initialized because it is determined that the average transmission rate avrgR$_n$ should be initialized at step S5.

At step S7, index parameters ($\alpha,\beta$) specified remotely through the call processing portion 105 is received, and the evaluation function (C$_n$) is calculated according to the following equation at step S8:

$$C_n = (R_n)^\alpha / (\text{avrg}R_n)^\beta.$$

Advantages of initializing the average transmission rate avrgR$_n$ at steps S5 and S6 will now be described. When the average transmission rate avrgR$_n$ approaches zero, the evaluation function value C$_n$ increases for the mobile station n. This causes HS-DSCH to be preferentially assigned to the mobile station n that has the reduced average transmission rate, which is proper operation in itself. However, an unnecessarily large number of HS-DSCHs would be assigned to the mobile station n if the mobile station n was, for example, in an abnormal state, and overall system throughput would be degraded because HS-DSCHs are prevented from being assigned to other mobile stations. Therefore, degradation of the overall system throughput can be avoided by initializing the average transmission rate avrgR$_n$ if, in consecutive predetermined time intervals Time$_{threshold}$, the average transmission rate avrgR$_n$ for the mobile station n is smaller than a predetermined threshold R$_{threshold}$.

At this time, the predetermined time interval Time$_{threshold}$ and the predetermined threshold R$_{threshold}$ are specified remotely, for example, from a high-layer node (for example, a radio network controller, or a server on the core network) of the wireless base station 100. For example, the high-layer node informs the wireless base station 100 of them, which are included in call processing control signals. The wireless base station 100 receives the predetermined time interval Time$_{threshold}$ and the predetermined threshold R$_{threshold}$ included in the call processing control signals at the call processing portion 105, and transfers them to the evaluation function calculation portion 180 in the MAC-hs processing portion 112 within the baseband signal processing portion 104. Alternatively, the predetermined time interval Time$_{threshold}$ and the predetermined threshold R$_{threshold}$ may be held as internal parameters of the wireless base station 100, and the evaluation function calculation portion 180 in the MAC-hs processing portion 112 within the baseband signal processing portion 104 may refers to the predetermined time interval Time$_{threshold}$ and the predetermined threshold R$_{threshold}$ in the internal parameters.

In the above example, appropriately setting $\alpha$ and $\beta$ values may provide an intermediate scheduler between a typical so-called Proportional Fairness scheduler ($\alpha=1$, $\beta=1$) and MAX C/I scheduler ($\alpha=1$, $\beta=0$). The present invention is not limited to the above embodiments, and may be applied to a scheduler in which a portion of the evaluation function C$_n$ is "$(R_n)^\alpha / (\text{avrg}R_n)^\beta$." For example, if a scheduler has the evaluation function expressed by such an equation as $$C_n = \{(R_n)^\alpha / (\text{avrg}R_n)^\beta\} * (W_n)^\gamma$$

(where, $\alpha$, $\beta$, and $\gamma$ are parameter coefficients from 0 to 1, Wn represents buffered time of packets in the wireless base station with respect to the mobile station n), a process according to the invention of initializing the average transmission rate avrgR$_n$ if, in consecutive predetermined time intervals Time$_{threshold}$, the average transmission rate avrgR$_n$ is smaller than a predetermined threshold R$_{threshold}$ may be added to the scheduler.

Once the evaluation function value C$_n$ has been calculated at step S8 in this way, it is determined whether the calculated evaluation function value C$_n$ is a maximum (step S9). At this time, because the initial value is set to C$_{max}$=0, the evaluation function value C$_n$ measured at step S8 is set to C$_{max}$, and a mobile station n given by the C$_{max}$ is set to a mobile station n$_{max}$ (step S10).

At step S11, the mobile station n is incremented by +1 in order to calculate the evaluation function for the next mobile station. Unless it is determined that the mobile station n exceeds the number (N) of mobile stations in communication with the wireless base station (NO at step S12), the loop procedure subsequent to the step S2 is repeated until it is determined that the number (N) of the mobile stations is exceeded. The evaluation function values C$_n$ for all mobile stations in communication with the wireless base station are thus calculated. On the other hand, if it is determined at step S12 that the mobile station n exceeds the number (N) of mobile stations in communication with the wireless base station (YES at step S12), the scheduler portion 140 is instructed to assign HS-DSCH (shared channel) to the mobile station n$_{max}$ set at step S10 (step S13).

According to the embodiments as described above, it may be possible to avoid a phenomenon that an unnecessarily large number of HS-DSCHs are assigned to a wireless mobile station in an abnormal state, and prevent degradation of overall system throughput, by initializing the average transmission rate avrgR$_n$ if, in consecutive predetermined time intervals Time$_{threshold}$, the average transmission rate avrgR$_n$ is smaller than a predetermined threshold R$_{threshold}$.

In the above example, one user has one priority queue. However, one user may have multiple priority queues (for example, K queues), and in such a case, the above scheduling is performed on N by K priority queues instead of N priority queues.

The evaluation function calculation portion 180 in the MAC-hs processing portion 112 is, for example, composed of a CPU, a digital signal processor (DSP) or other programmable devices such as FPGA, which allow its program to be rewritten, and is configured to store the program of the evaluation function as described above in a predetermined memory region and download the parameters ($\alpha$, $\beta$, $\delta$, Time$_{threshold}$, and R$_{threshold}$) to rewrite the program. At this time, the parameters ($\alpha$, $\beta$, $\delta$, Time$_{threshold}$, and R$_{threshold}$) may be downloaded from a high-layer node of the wireless base station, or a terminal I/F (external interface capability) may be provided to the evaluation function calculation portion 180 and the parameters ($\alpha$, $\beta$, $\delta$, Time$_{threshold}$, and R$_{threshold}$) may be directly read from the terminal.

The functional blocks in the MAC-hs processing portion 112 as described above may either be divided on a hardware basis, or on a software basis in a program on the processor.

Although the above examples have been described in terms of a high-speed packet transmission mode HSDPA in 3GPP, the present invention is not limited to the HSDPA and may be applied to other high-speed packet transmission modes for downlink packet transmission control (scheduling) in a mobile communication system. For example, other high-speed packet transmission modes include cdma2000 1x EV- DO in 3GPP2, TDD mode in 3GPP, a high-speed packet transmission mode in Long Term Evolution, and the like.

In the above examples, the baseband signal processing portion 104 corresponds to channel assignment means for assigning a channel to a plurality of wireless terminals. Additionally, the mobile station transmission rate initializing portion 160 corresponds to initializing means for initializing the average transmission rate value. In the above description, it is noted that "assigning HS-DSCH to a wireless mobile station" means that HS-DSCH is used for transmission to a mobile station in a TTI, and "assigning a large number of HS-DSCHs to a wireless mobile station" means that HS-DSCH is used for transmission to a mobile station in a large number of TTIs.

(Variations)

In packet transmission in a packet communication network, it is conceivable to provide a Proportional Fairness scheduler that provides a minimum guaranteed transmission rate that should be guaranteed and provides features to guarantee the minimum rate.

In the embodiment, a description will now be given of a Proportional Fairness scheduler, which defines a minimum guaranteed transmission rate that should be guaranteed and provides features to guarantee the minimum rate, combined with a packet transmission control method according to the invention.

Figure 8:
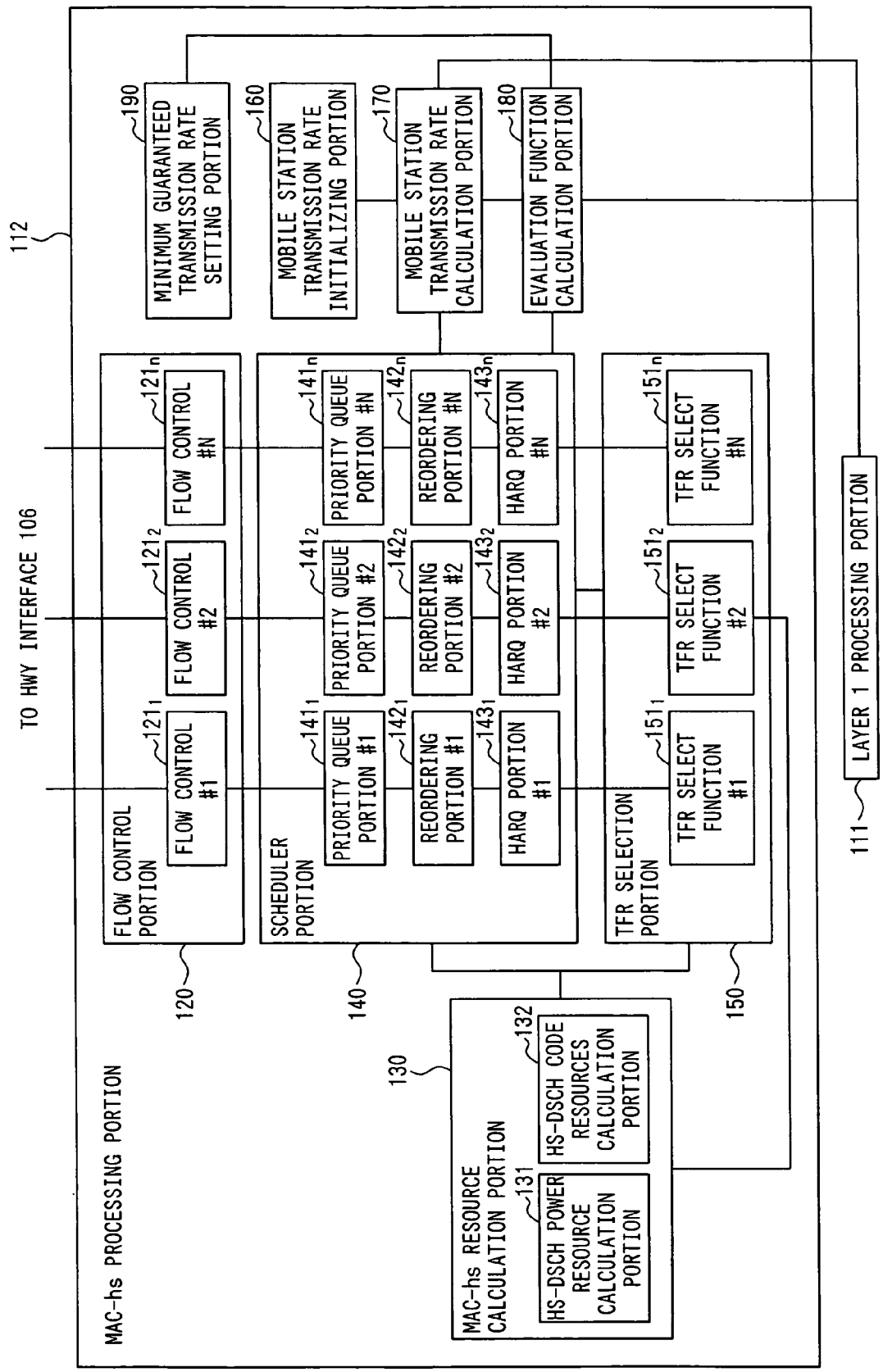
FIG. 8 is a functional block diagram illustrating a functional configuration of the MAC-hs processing portion in the wireless base station according to an exemplary variation of the invention.

FIG. 8 is a functional block diagram illustrating an example of a functional configuration of the MAC-hs processing portion 112 of the variation.

The functional configuration in this figure is different from that in FIG. 4 in that a minimum guaranteed transmission rate setting portion 190 is added thereto. The minimum guaranteed transmission rate setting portion 190 and mobile station transmission rate initializing portion 160 will now be described.

The minimum guaranteed transmission rate setting portion 190 sets a minimum guaranteed transmission rate $R_n^{(target)}$ that corresponds to a minimum guaranteed transmission rate that should be guaranteed for downlink packets in priority queues $141_1$ to $141_N$. The minimum guaranteed transmission rate setting portion 190 may be configured to set the minimum guaranteed transmission rate $R_n^{(target)}$ in response to are mote specification through the call processing portion 105.

The minimum guaranteed transmission rate setting portion 190 may also be configured to set the minimum guaranteed transmission rate $R_n^{(target)}$ on per service type, per agreement type, per terminal type, per cell type, or per Priority Class bases.

For example, the service type indicates service types in transferring downlink packets and includes, for example, a VoIP service, a speech service, a streaming service, an FTP service, and the like. The agreement type indicates agreement types with which a user has been subscribing at a destination mobile station for the downlink packets and includes, for example, Low Class agreement, High Class agreement, and the like. The terminal type is used to classify performance of the destination mobile station for the downlink packets and include: classes based on identification of the mobile station; presence or the type of a RAKE receiver, an equalizer, a receiver diversity, or an interference canceller; terminal capabilities such as the receivable modulation mode, number of codes or number of bits; and the like. The cell type indicates types of cell forms in which the destination mobile station for the downlink packets resides and includes, for example, classes based on identification of the cell; indoor or outdoor; a suburb or an urban area; a high-traffic zone or a low-traffic zone; and the like.

Further the Priority Class type indicates priorities with respect to the downlink packet transmission and, for example, the first priority downlink packets are preferentially transmitted over the second priority downlink packets.

The minimum guaranteed transmission rate setting portion 190 is configured to, if $\text{avrgR}_n - R_n^{(target)} \leq R_n^{minus}$ ($\text{avrgR}_n$: average transmission rate, $R_n^{(target)}$: minimum guaranteed transmission rate), set the value $R_n^{minus}$ to the denominator of the evaluation function $C_n$ on per priority queues $141_1$ to $141_N$ basis.

The mobile station transmission rate initializing portion 160 receives average transmission rate $\text{avrgR}_n$ (average transmission rate calculated for each of the priority queues $141_1$ to $141_N$) for the mobile station n from the mobile station transmission rate calculation portion 170 as described below, and receives a minimum guaranteed transmission rate $R_n^{(target)}$ that corresponds to a minimum guaranteed transmission rate that should be guaranteed for downlink packets in priority queues $141_1$ to $141_N$ from the minimum guaranteed transmission rate setting portion 190. If it is determined that the average transmission rate $\text{avrgR}_n$ should be initialized, the mobile station transmission rate initializing portion 160 informs the mobile station transmission rate calculation portion 170 of the determination.

In determining whether or not the average transmission rate $\text{avrgR}_n$ should be initialized at this time, if, for example, a value determined by subtracting the minimum guaranteed transmission rate $R_n^{(target)}$ from the average transmission rate $\text{avrgR}_n$, that is ($\text{avrgR}_n - R_n^{(target)}$), is smaller than a predetermined threshold $R_{threshold}$, it is determined that the average transmission rate $\text{avrgR}_n$ should be initialized. Alternatively, for example, if the ($\text{avrgR}_n - R_n^{(target)}$) is smaller than a predetermined threshold $R_{threshold}$ in consecutive predetermined time intervals $\text{Time}_{threshold}$, it is determined that the average transmission rate $\text{avrgR}_n$ should be initialized.

Figure 9:
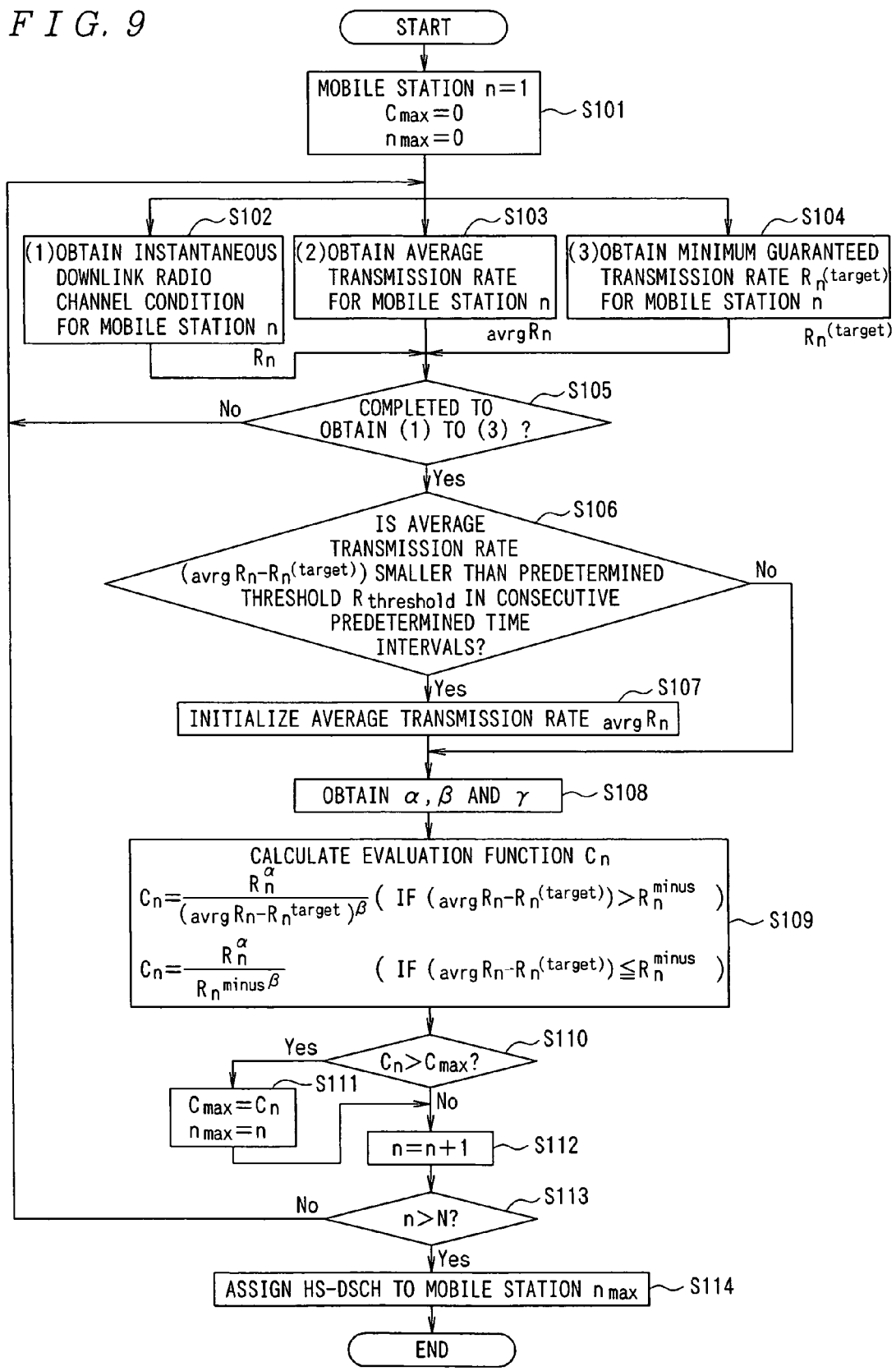
FIG. 9 is a flowchart illustrating the scheduling operation in the MAC-hs processing portion in FIG. 8.
Figure 10:
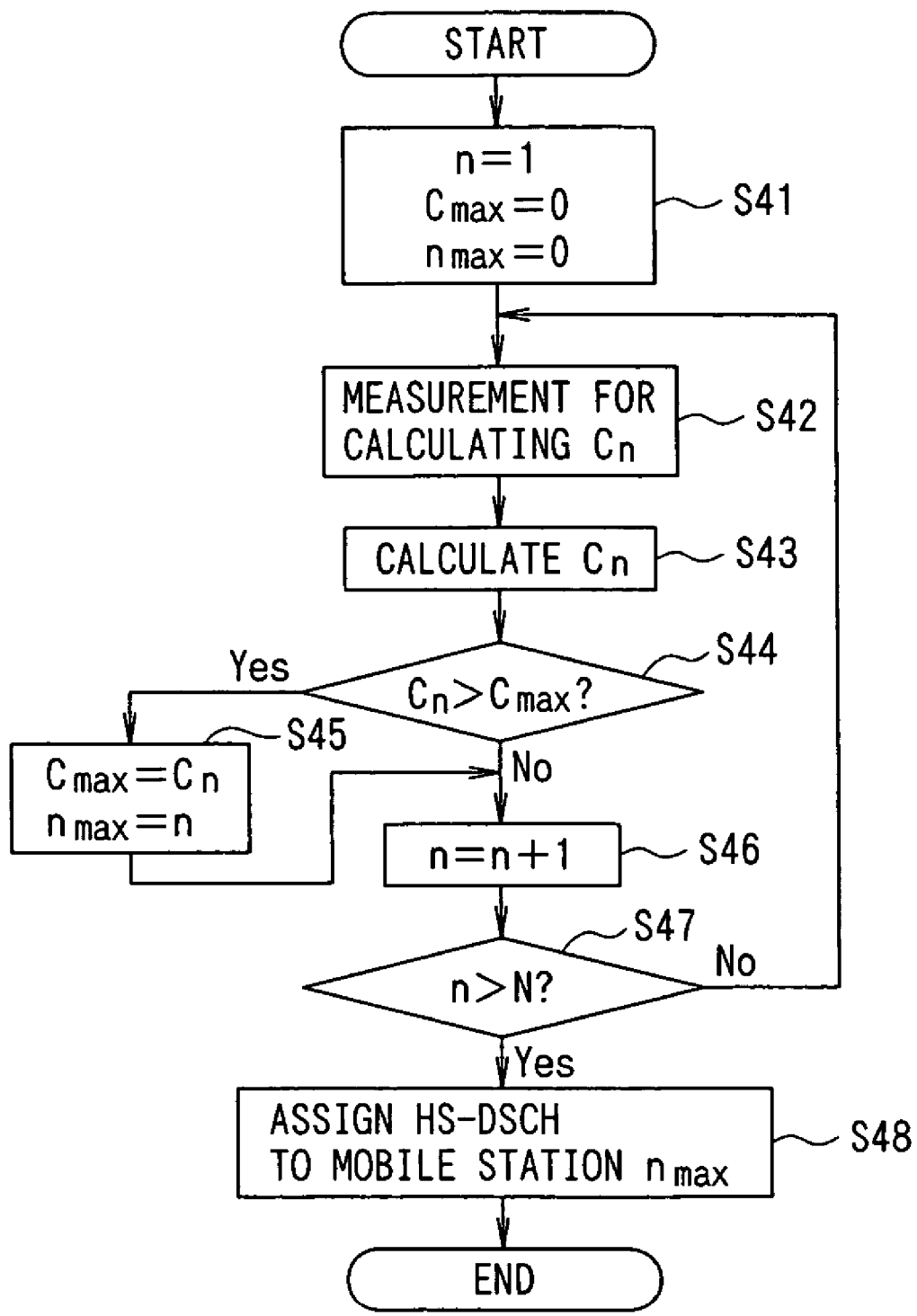
FIG. 10 is a flowchart illustrating operation of a conventional scheduling algorism.

Using the flowchart in FIG. 9, the scheduling operation in the MAC-hs processing portion 112 according to the variation will now be described.

In this figure, the evaluation function calculation portion 180 in the MAC-hs processing portion 112 first sets an initial value which is used to calculate an evaluation function for a mobile station n at step S101.

(Setting an Initial Value)

$n=1$ $C_{max}=0$ $n_{max}=0$

In the above equations, n represents an index for the mobile station, $C_{max}$ represents the maximum value from the evaluation function, and $n_{max}$ represents an index for the mobile station that has the maximum evaluation function value.

At steps S102 to S104, information is obtained for use in calculating the evaluation function $C_n$, as described below in (1) to (3).

(1) Step S102: An instantaneous downlink radio channel condition for the mobile station n outputted from the layer 1 processing portion 111, or the size (amount of data) of transmittable data estimated from the radio channel condition is obtained (where "size of transmittable data estimated from the radio channel condition" represents a data size estimated to be transmittable with a predetermined error rate from both CQI indicative of downlink channel quality or instantaneous SIR for the downlink transmission channel, and radio resources that are to be assigned to HS-DSCH and calculated in the MAC-hs resource calculation portion).

(2) Step S103: An average transmission rate $\text{avrgR}_n$ for the mobile station n outputted from the mobile station transmission rate calculation portion 170 is obtained.

(3) Step S104: the evaluation function calculation portion 180 obtains a minimum guaranteed transmission rate $R_n^{(target)}$ that should be guaranteed for packets in priority queues (#n) 141$_n$ (assigned to the mobile station #n) from the minimum guaranteed transmission rate setting portion 190, and if $$\text{avrgR}_n - R_n^{(target)} \leq R_n^{minus},$$

also obtains a parameter $R_n^{minus}$ to be set in the denominator of the evaluation function $C_n$.

At step S105, it is determined whether all information in the above (1) to (3) has been obtained, and if it is determined that all information in the above (1) to (3) has been obtained (YES at step S105), then the process proceeds to the next step, and otherwise (NO at step S105), information from (1) to (3), which has not been obtained, is obtained.

At step S106, it is determined whether or not the average transmission rate $\text{avrgR}_n$ should be initialized. For example, in consecutive predetermined time intervals $\text{Time}_{threshold}$, if a value determined by subtracting the minimum guaranteed transmission rate $R_n^{(target)}$ that should be guaranteed from the average transmission rate $\text{avrgR}_n$, that is $(\text{avrgR}_n - R_n^{(target)})$, is smaller than a predetermined threshold $R_{threshold}$ (YES at step S106), then the process proceeds to step S107, and otherwise (NO at step S106), it proceeds to step S108.

At step S107, the average transmission rate $\text{avrgR}_n$ is initialized because it is determined that the average transmission rate $\text{avrgR}_n$ should be initialized at step S106.

At step S108, index parameters $(\alpha,\beta)$ specified remotely through the call processing portion 105 is received, and the evaluation function $(C_n)$ is calculated according to the following equation at step S109:

if $(\text{avrgR}_n - R_n^{(target)}) > R_n^{minus}$, then $C_n = (R_n)^\alpha / (\text{avrgR}_n - R_n^{(target)})^\beta$, and if $\text{avrgR}_n - R_n^{(target)} \leq R_n^{minus}$, then $C_n = (R_n)^\alpha / (R_n^{minus})^\beta$.

The value of $R_n^{minus}$ here may be the same as the predetermined threshold $R_{threshold}$ or may separately be defined.

Advantages of initializing the average transmission rate $\text{avrgR}_n$ at steps S106 and S107 will now be described. When the average transmission rate $\text{avrgR}_n$ approaches the minimum guaranteed transmission rate $R_n^{(target)}$ that should be guaranteed, the evaluation function value $C_n$ increases for the mobile station n. This causes HS-DSCH to be preferentially assigned to the mobile station n with its average transmission rate approaching the minimum guaranteed transmission rate $R_n^{(target)}$ that should be guaranteed, which is proper operation in itself. However, an unnecessarily large number of HS-DSCHs would be assigned to the mobile station n if the mobile station n was, for example, in an abnormal state, so that overall system throughput would be degraded because HS-DSCHs are prevented from being assigned to other mobile stations. Therefore, in a predetermined time intervals $\text{Time}_{threshold}$, degradation of the overall system throughput can be avoided by initializing the average transmission rate $\text{avrgR}_n$ if a value determined by subtracting the minimum guaranteed transmission rate $R_n^{(target)}$ that should be guaranteed from the average transmission rate $\text{avrgR}_n$ for the mobile station n, that is $(\text{avrgR}_n - R_n^{(target)})$, is smaller than a predetermined threshold $R_{threshold}$.

At this time, the predetermined time interval $\text{Time}_{threshold}$ and the predetermined threshold $R_{threshold}$ are specified remotely, for example, from a high-layer node (for example, a radio network controller, or a server on the core network) of the wireless base station 100. For example, the high-layer node informs the wireless base station 100 of them, which are included in call processing control signals. The wireless base station 100 receives the predetermined time interval $\text{Time}_{threshold}$ and the predetermined threshold $R_{threshold}$ included in the call processing control signals at the call processing portion 105, and transfers them to the evaluation function calculation portion 180 in the MAC-hs processing portion 112 within the baseband signal processing portion 104. Alternatively, the predetermined time interval $\text{Time}_{threshold}$ and the predetermined threshold $R_{threshold}$ may be held as internal parameters of the wireless base station 100, and the evaluation function calculation portion 180 in the MAC-hs processing portion 112 within the baseband signal processing portion 104 may refers to the predetermined time interval $\text{Time}_{threshold}$ and the predetermined threshold $R_{threshold}$ in the internal parameters.

Once the evaluation function value $C_n$ has been calculated at step S109 in this way, it is determined whether the calculated evaluation function value $C_n$ is a maximum (step S110). At this time, because the initial value is set to $C_{max}=0$, the evaluation function value $C_n$ measured at step S109 is set to $C_{max}$, and a mobile station n given by the $C_{max}$ is set to a mobile station $n_{max}$ (step S111).

At step 5112, the mobile station n is incremented by +1 in order to calculate the evaluation function for the next mobile station. Unless it is determined that the mobile station n exceeds the number (N) of mobile stations in communication with the wireless base station (NO at step S113), the loop procedure subsequent to the step S102 is repeated until it is determined that the number (N) of the mobile stations is exceeded. The evaluation function values $C_n$. for all mobile stations in communication with the wireless base station are thus calculated. On the other hand, if it is determined at step S113 that the mobile station n exceeds the number (N) of mobile stations in communication with the wireless base station (YES at step S113), the scheduler portion 140 is instructed to assign a HS-DSCH (a shared channel) to the mobile station $n_{max}$ set at step S111 (step S114).

According to the embodiments as described above, it may be possible to avoid a phenomenon that an unnecessarily large number of HS-DSCHs are assigned to a wireless mobile station in an abnormal state, and prevent degradation of overall system throughput, by initializing the average transmission rate $\text{avrgR}_n$ if, in consecutive predetermined time intervals $\text{Time}_{threshold}$, a value determined by subtracting the minimum guaranteed transmission rate $R_n^{(target)}$ that should be guaranteed from the average transmission rate $\text{avrgR}_n$, that is $(\text{avrgR}_n - R_n^{(target)})$ is smaller than a predetermined threshold $R_{threshold}$.

In the above example, one user has one priority queue. However, one user may have multiple priority queues (for example, K queues), and in such a case, the above scheduling is performed on N by K priority queues instead of N priority queues.

In the above description, even when an average radio channel quality such as SIR and CQI is used in place of the average transmission rate for a wireless terminal, initializing these values may contribute to avoiding a phenomenon that an unnecessarily large number of HS-DSCHs are assigned to a wireless mobile station in an abnormal state, and preventing degradation of overall system throughput.

The present invention may be used to avoid a phenomenon that an unnecessarily large number of HS-DSCHs are assigned to a wireless mobile station in an abnormal state, and prevent degradation of overall system throughput.

What is claimed is:

1. A packet transmission control device for controlling transmission of packets to each of a plurality of wireless terminals, the packet transmission control device comprising:
channel assignment means for assigning a channel to the plurality of wireless terminals, based on an evaluated value calculated by the evaluation function calculation portion from an evaluation function including in a denominator of the evaluation function an average radio channel quality value for each of the wireless terminals, the evaluation function being $C_n=(R_n)^\alpha/(avrgR_n)^\beta$, where $R_n$ is the radio channel condition, $avrgR_n$ is the average transmission rate of a wireless terminal n, and $\alpha$ and $\beta$ are parameter coefficients between 0 and 1; and
initializing means for initializing the average transmission rate when the evaluated value becomes an abnormal value, that is, when the evaluated value approaches zero;
wherein when one of the plurality of wireless terminals transitions to an abnormal state, the frequency of assigning packets to the wireless terminal is reduced.

2. The packet transmission control device according to claim 1, wherein
the initializing means initializes the average transmission rate value if the average transmission rate value is smaller than a predetermined threshold in consecutive predetermined time intervals, and
the channel assignment means assigns the channel based on the evaluated value from the evaluation function using the average transmission rate value initialized by the initializing means.

3. The packet transmission control device according to claim 2, wherein
the wireless terminal that has a maximum evaluated value from the evaluation function $C_n$ is selected as a party to which packets are transmitted.

4. The packet transmission control device according to claim 3, wherein the initializing means applies the same value as the radio channel condition $R_n$ to the value of the average transmission rate $avrgR_n$ for the wireless terminal if the average transmission rate for the wireless terminal is smaller than the predetermined threshold.

5. The packet transmission control device according to claim 2, wherein the initializing means sets the threshold on any one of the following bases: per service type, per agreement type, per terminal type, per user, per cell, or per Priority Class.

6. The packet transmission control device according to claim 2, wherein the initializing means sets the consecutive predetermined time intervals on any one of the following bases: per service type, per agreement type, per terminal type, per user, per cell, or per Priority Class.

7. The packet transmission control device according to claim 1, further comprising minimum guaranteed transmission rate setting means for setting a minimum guaranteed transmission rate, and wherein
the initializing means initializes the average transmission rate value if a value determined by subtracting the minimum guaranteed transmission rate from the average transmission rate for the wireless terminal is smaller than the predetermined threshold in consecutive predetermined time intervals, and
the channel assignment means assigns the channel based on the evaluated value from the evaluation function using the average transmission rate value initialized by the initializing means.

8. The packet transmission control device according to claim 7, wherein
the evaluation function is $C_n=(R_n)^\alpha/(avrgR_n-R_n^{(target)})^\beta$, where $R_n$ is the radio channel condition, $avrgR_n$ is the average transmission rate, $R_n^{(target)}$ is the minimum guaranteed transmission rate of the wireless terminal n, and $\alpha$ and $\beta$ are parameter coefficients between 0 and 1, and
the wireless terminal that has a maximum evaluated value from the evaluation function $C_n$ is selected as a party to which packets are transmitted.

9. The packet transmission control device according to claim 8, wherein the initializing means applies the same value as the radio channel condition $R_n$ to the value of the average transmission rate $avrgR_n$ for the wireless terminal, if the average transmission rate for the wireless terminal is smaller than the predetermined threshold and a value determined by subtracting the minimum guaranteed transmission rate value from the value of the average transmission rate $avrgR_n$ for the wireless terminal is smaller than the predetermined threshold.

10. The packet transmission control device according to claim 1, wherein either SIR (Signal-to-Interference) or CQI (Channel Quality Indicator) is used in place of the average transmission rate for the wireless terminal.

11. A packet transmission control method for controlling transmission of packets to each of a plurality of wireless terminals, the method comprising:
assigning a channel to the plurality of wireless terminals based on an evaluated value from an evaluation function including in a denominator of the evaluation function an average radio channel quality value for each of the wireless terminals, the evaluation function being $C_n=(R_n)^\alpha/(avrgR_n)^\beta$, where Rn is the radio channel condition, $avrgR_n$ is the average transmission rate of a wireless terminal n, and $\alpha$ and $\beta$ are parameter coefficients between 0 and 1; and
initializing the average radio channel quality value when the evaluated value becomes an abnormal value, that is, when the average transmission rate $avrgR_n$ approaches zero,
wherein when one of the plurality of wireless terminals transitions to an abnormal state, the frequency of assigning packets to the wireless terminal is reduced.

* * * * *